United States Patent [19]

Fujisawa

[11] Patent Number: 5,467,239

[45] Date of Patent: Nov. 14, 1995

[54] DISC CARTRIDGE WITH RIBBED SHUTTER

[75] Inventor: Hirotoshi Fujisawa, Tokyo, Japan

[73] Assignee: Sony Corporation, Tokyo, Japan

[21] Appl. No.: 817,049

[22] Filed: Jan. 6, 1992

[30] Foreign Application Priority Data

Jan. 11, 1991 [JP] Japan .................................. 3-012683
Jan. 16, 1991 [JP] Japan .................................. 3-014908

[51] Int. Cl.$^6$ .................................................. G11B 23/03
[52] U.S. Cl. ........................................................ 360/133
[58] Field of Search .............................. 360/133; 369/291

[56] References Cited

U.S. PATENT DOCUMENTS

| | | | |
|---|---|---|---|
| 4,851,948 | 7/1989 | Kato et al. | 360/133 |
| 4,876,619 | 10/1989 | Suzuki | 360/133 |
| 4,991,048 | 2/1991 | Ikebe et al. | 360/133 |
| 5,034,844 | 7/1991 | Shiba et al. | 360/133 |
| 5,040,167 | 8/1991 | Tanaka et al. | 360/133 |
| 5,051,857 | 9/1991 | Akiyama | 360/133 |
| 5,121,380 | 6/1992 | Fujita et al. | 369/133 |
| 5,151,894 | 9/1992 | Fujita | 360/291 |
| 5,161,080 | 11/1992 | Funayama et al. | 360/133 |

FOREIGN PATENT DOCUMENTS

| | | |
|---|---|---|
| 0264237A3 | 4/1988 | European Pat. Off. . |
| 0336637A2 | 10/1989 | European Pat. Off. . |
| 0343844A2 | 11/1989 | European Pat. Off. . |
| 0348937A3 | 1/1990 | European Pat. Off. . |
| 0360549A2 | 3/1990 | European Pat. Off. . |

OTHER PUBLICATIONS

Patent Abstracts of Japan, vol. 12, No. 123 (P-690), 16 Apr. 1988 & JP-A-62 248 181 (Hitachi Maxwell), 29 Oct. 1987.

*Primary Examiner*—Stuart S. Levy
*Assistant Examiner*—Jefferson Evans
*Attorney, Agent, or Firm*—Limbach & Limbach; Shaw, Jr. Philip M.

[57] ABSTRACT

A disc cartridge including a cartridge body having an aperture for exposing a part, of a disc accommodated in it to an exterior environment and a shutter member formed integrally of a slide portion engaged with a groove in a lateral side of the cartridge body for being slidably supported by the cartridge body and a shutter portion for opening or closing the aperture. The shutter member is mounted on the cartridge body for sliding between a first position of closing the aperture and a position of opening the aperture. The shutter member is formed with a tongue extended along a lateral side of the cartridge body so that the lenght of the slide portion in the sliding direction is longer than the length of the shutter portion in the same direction. The shutter member is prevented from being tilted in the sliding direction to assure stable sliding.

6 Claims, 8 Drawing Sheets

DISC CARTRIDGE WITH RIBBED SHUTTER

BACKGROUND OF THE INVENTION

1. Field of the Invention

This invention relates to a disc cartridge having accommodated therein a disc on which predetermined information signals are recordable or have been recorded, such as a magneto-optical disc or an optical disc. More particularly, it relates to a disc cartridge provided with a shutter for opening and closing an aperture by means of which at least a part of a signal recording area of the disc may be radially exposed to an exterior environment.

2. Description of Related Art

There has previously been proposed a disc for recording and/or reproducing information signals, such as a magneto-optical disc or an optical disc. This disc is comprised of a disc-shaped base plate and a recording layer formed on at least one major surface of the base plate. The central portion of the disc is formed as a clamp area which is to be retained by a disc driving unit of a disc recording and/or reproducing apparatus adapted for recording and/or reproducing information signals on or from the disc. The portion of the disc lying around the clamp area is reserved as a signal recording area on or from which the information signals are recorded of read.

Referring to FIG. 1, there has hitherto been proposed a disc cartridge comprised of a cartridge body 103 and a shutter member 110 which is accommodated within the cartridge body 103 and the shutter member 110 with a view to preventing deposition of dust and dirt on a disc 102 or injuries thereto due to contact especially with user's hands or fingers as well as to facilitating handling of the disc 102. The disc 102 accommodated within the cartridge body 103 may be rotated therein by disc rotating means. Referring to FIG. 2, the major surface of the cartridge body 103 is formed with an aperture 107 by means of which at least a part of the signal recording area of the disc may be exposed to an exterior environment across its inner and outer peripheries. The information signals may be recorded and/or reproduced on or from the signal recording surface by means of the disc recording and/or reproducing apparatus, through the aperture 107.

The disc cartridge is provided with the shutter member 110 adapted for closing the aperture 107 during non-use the disc cartridge as shown in FIG. 1 for protecting the disc 101 by preventing intrusion of dust and dirt into the inside of the cartridge body 103. The shutter member 110 is provided with a shutter portion or plate portion 111 of a size large enough to close the aperture 107. The shutter portion 105 is formed with a opening 109 corresponding in size and shape to the aperture 107. The shutter member 110 is mounted by the cartridge body 103 for sliding along a lateral side of the cartridge body 103 by having its end face 113 supported by a corresponding lateral side of the cartridge body 103. The shutter member 110 is supported in this manner for sliding between a first position of closing the aperture 107 by the shutter portion 111 as shown in FIG. 1 and a second position of opening the aperture 107 with the aperture 109 then being in register with the aperture 107 as shown in FIG. 2, as disclosed for example in U.S. Pat. Nos. 4,714,973 and 4,685,017.

A recess 115 for guiding the shutter portion 111 is formed on a major surface of the cartridge body 103 in an area thereof corresponding to the travel passage of the shutter portion 105. The recess 115 is of a depth corresponding to the thickness of the shutter portion 111. Thus the upper surface of the shutter portion 111 is substantially flush with the major surface of the cartridge body 103 for the entire sliding stroke of the shutter member 110 with respect to the cartridge body 103.

Meanwhile, the shutter member 110 is constituted by bending a substantially rectangular metallic plate. The shutter member 110 may also be formed by bending a plate of synthetic resin or by integral molding of synthetic resin.

It is noted that, when the disc cartridge is loaded into the disc recording and/or reproducing apparatus, the shutter member 110 has its proximal end 113, supported by the corresponding lateral side of the cartridge body 103, thrust by shutter opening means, not shown, provided in the disc recording and/or reproducing apparatus, so that the shutter member 110 is slid from the above mentioned first position to the second position, as indicted by arrow c in FIG. 2.

When the shutter member 110 is slid in this manner by the disc recording and/or reproducing apparatus, the shutter member 111 is subjected to a tilting force relative to the sliding direction under a force of friction between the cartridge body 103 and the distal free end of the shutter portion 111. If the shutter portion 111 is shorter in length in a direction along a lateral side of the cartridge body 103 indicated by double-headed arrow a in FIG. 1 than in a direction normal to the aforementioned lateral side indicated by double-headed arrow b in FIG. 1, the shutter portion 11 tends to be tilted with respect to the sliding direction as indicated by arrow d in FIG. 1. Should the shutter portion 111 be tilted with respect to the sliding direction, the shutter member 110 can not be slid smoothly with respect to the cartridge body 103.

On the other hand, if the shutter portion 111 is shorter in length in the direction along the aforementioned one lateral side of the cartridge body 103 than in the direction normal thereto, the shutter portion 111 is extended a longer distance from its proximal end 113 towards its distal end, so that it becomes difficult to form the shutter portion 111 as a flat plate.

For this reason, the shutter portion 111 is longer in the direction along the aforementioned one lateral side of the cartridge body 103, that is, in the sliding direction of the shutter member 110, than in the direction normal to the sliding direction of the shutter member 110. Above all, if the shutter portion 111 iS formed of synthetic resin, since the shutter portion 111 is lower in toughness than if the shutter portion is formed of metal , it becomes more necessary that the shutter portion 111 be longer in the direction along its sliding direction than in the direction normal thereto.

However, if the shutter portion 111 has a longer length in its sliding direction, the proportion of the area taken up by the shutter section guide recess 115 to the entire area of the major surface of the cartridge body 103 is necessarily increased. If the proportion of the area taken up by the shutter guide recess 115 is increased in this manner, it becomes difficult to provide the major surface with a so-called positioning holes or to apply a label on the major surface. These positioning holes are used for securing the disc cartridge in position within the disc recording and/or reproducing apparatus, while the label are used for indicating the contents of information signals recorded on the disc 102.

On the other hand, if the length in the sliding direction of the shutter portion 111 is increased as described above, there may arise a risk that the cartridge body 103 be correspondingly increased in size. That is, since the distance by which the shutter member 110 can be slid relative to the cartridge body 103 is determined by the size of the aperture 107 formed in the cartridge body 103, if the shutter portion 111 is of a longer length in the sliding direction of the shutter member 110, there may arise the risk that, when the shutter member 110 is slid relative to the cartridge body 103, the shutter portion 111 be protruded beyond the corresponding lateral side of the cartridge body 103.

OBJECTS AND SUMMARY OF THE INVENTION

It is an object of the present invention to provide a disc cartridge in which the shutter member, above all, its shutter portion for opening or closing an aperture formed in the cartridge body, may be reduced in size for reducing the size of the disc cartridge.

It is another object of the present invention to provide a disc cartridge wherein the shutter member mounted on the cartridge body may be slid smoothly and wherein the aperture formed in the cartridge body may be opened or closed positively.

It is a further object of the present invention to provide a disc cartridge provided with a shutter member which may be molded easily of synthetic resin.

For accomplishing the above objects, a disc cartridge of the present invention includes a shutter slidably mounted on a cartridge body having accommodated therein a disc and having an aperture for radially exposing at least a portion of a signal recording surface of the disc to an exterior environment by the shutter. The shutter is integrally formed of a slide portion slidably mounted on a lateral side of the cartridge body, and a shutter portion for opening or closing the aperture. The shutter is of a size large enough to close the aperture and is slid between a first position of closing the aperture by the shutter portion and a second position of opening the aperture. The slide portion is formed with a tongue extended along the lateral side of the cartridge body so that the length of the slide portion along the sliding direction of the shutter is longer than the length of the shutter portion along the sliding direction.

Other objects and advantages of the present invention become apparent from the following description.

DETAILED DESCRIPTION OF THE INVENTION

Figure 1:
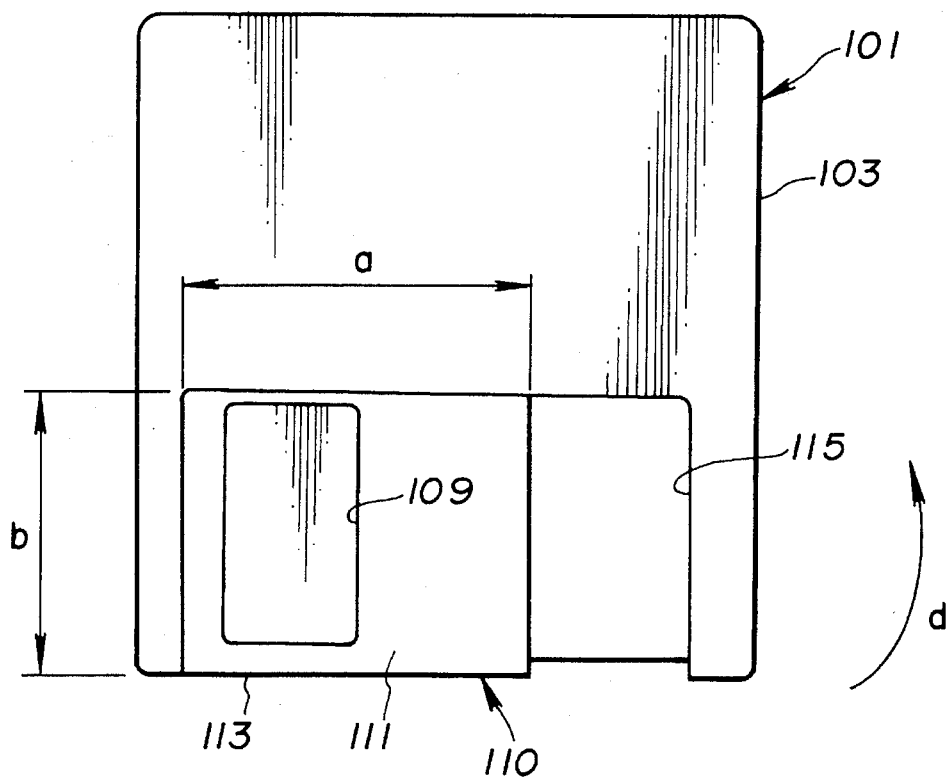
FIG. 1 is a plan view showing a disc cartridge including a conventional shutter member, with the shutter member closing a recording/reproducing aperture.
Figure 2:
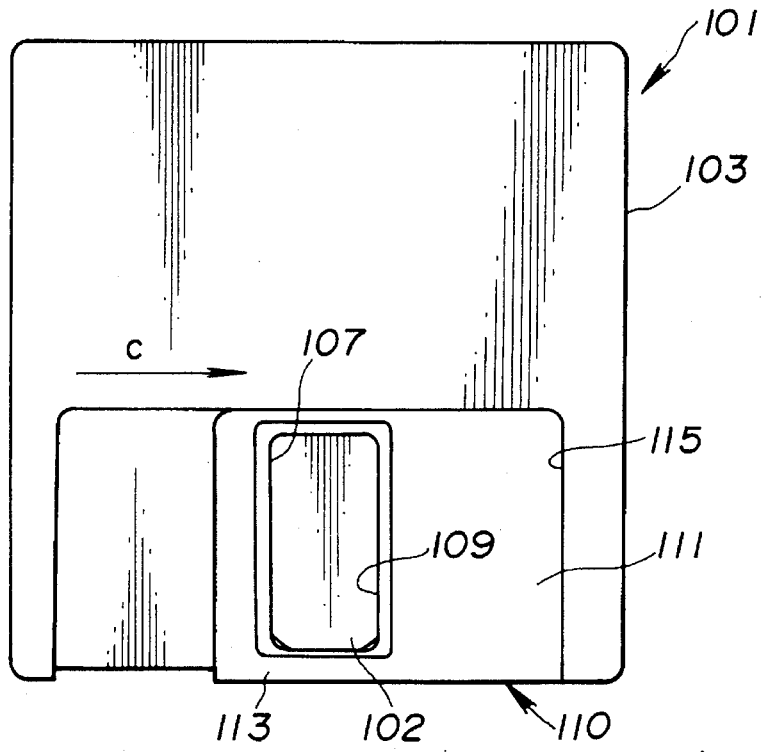
FIG. 2 is a similar view to FIG. 2 but with the shutter member opening the recording/reproducing aperture.

Referring to the drawings, preferred embodiments of the present invention will be explained in detail.

The first embodiment of the present invention is directed to a disc cartridge 1 having an optical disc 2 accommodated in a cartridge body.

Figure 5:
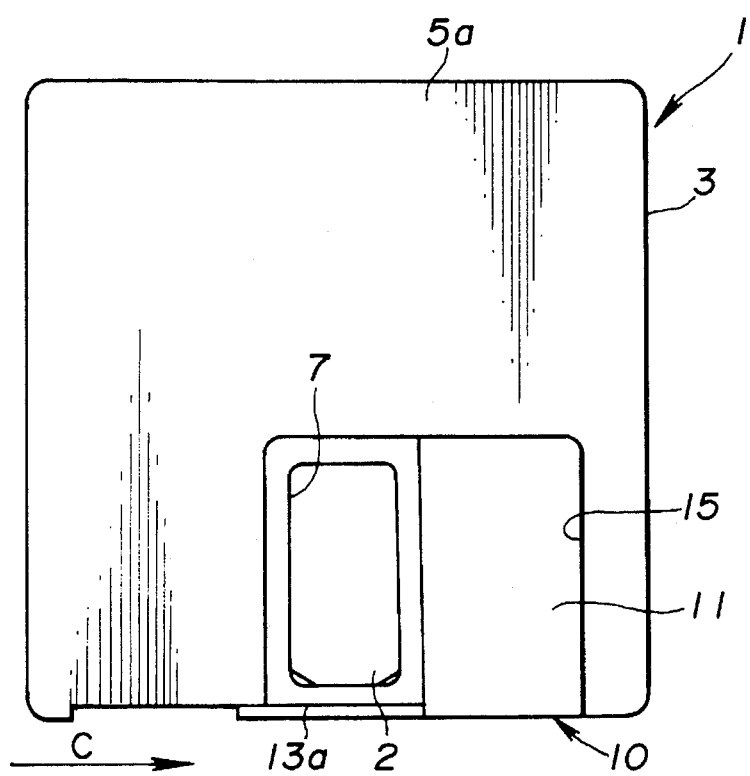
FIG. 5 is a plan view showing the disc cartridge shown FIG. 3, with the shutter portion of the shutter member in the second position.

Referring first to FIG. 5, the disc cartridge 1 includes a disc 2 and a cartridge body 3 for accommodating the disc 2. The disc 2, accommodated in the Cartridge body 3, is a so-called optical disc in which a recording layer is formed by depositing and molding an optical recording material or a light reflective material on a base plate formed of a light-transmitting synthetic resin or glass. The disc 2 is formed with a central disc hub 4 by means of which the disc may be clamped with respect to a disc rotating device provided within the disc recording and/or reproducing apparatus adapted for recording and/or reproducing information signals on or from the recording layer.

The disc hub 4 is disc-shaped and formed of a magnetic material, such as metal. The portion of the disc 2 lying around the disc hub 4 represents a signal recording area for recording and/or reproducing information signals with the aid of the disc recording and/or reproducing apparatus.

On the other hand, the cartridge body 3 is comprised of an upper half 5a and a mating lower half 6a made of synthetic resin which are abutted and connected to each other such as by ultrasonic welding, adhesive or with set screws in the form of a thin-walled substantially square-shaped casing. That is, each of upper and lower major surfaces 5a and 6a of the cartridge body 3 extending parallel to the major surface of the disc 1 is in the form of a square each side of which is slightly shorter than the disc diameter. The distance between the major surfaces 5a and 6a, that is the thickness of the cartridge body 3, is slightly thicker than the thickness of the disc hub 4.

The major surfaces 5a and 6a of the cartridge body 3 are formed with an upper recording/reproducing aperture 7 and a lower recording/reproducing aperture 8, respectively, which are in register with each other. These recording/reproducing apertures 7 and 8 are rectangular in profile and extended from near the center of the major surfaces 5a and 6a to close to one sides of the surfaces 5a and 6a, respectively, that is to close to near a lateral side of the cartridge body 3, so as to be in register with each other with the disc 1 in-between. The upper aperture 7 is adapted for exposing a portion of the signal recording surface of the disc 2 directed towards the upper half 5 to an exterior environment across the inner and outer peripheries of the disc. On the other hand, the lower aperture 8 is adapted for exposing a portion of the signal recording surface of the disc 2 directed towards the lower half 5 to an exterior environment across the inner and outer peripheries of the disc. The recording and/or reproducing unit of the disc recording and/or reproducing apparatus, such as an optical head device, is introduced via these apertures 7 and 8 into the cartridge body 3 for recording and/or reproducing information signals on or from the disc 1.

Meanwhile, if the disc 2 accommodated within the cartridge body 3 is a magneto-optical disc, an external magnetic field generating device for supplying the external magnetic field to the disc needs to be provided in the disc recording and/or reproducing apparatus in addition to the optical head device.

The major surface of the lower half 6 is formed with a circular chucking aperture 9 for permitting the lower surface of the disc hub 4 to be exposed to outside. It is by means of this chucking aperture 8 that a chucking device of disc rotating means of the disc recording and/or reproducing apparatus, such as a disc table, is introduced into the cartridge body 3 for chucking the disc 2.

A shutter member 10 for opening or closing the recording/reproducing apertures 7 and 8 is mounted on the cartridge body 3. The shutter member 9 is comprised of a slide portion 13, supported by a lateral side of the cartridge body 3, and upper and lower plate portion or shutter portions 11 and 12, and is formed integrally from a synthetic resin, such as polyacetal resin. The slide portion 13 is in the form of an elongated plate having a width equal to the thickness of the cartridge body 3. The shutter portions 11 and 12 are in the form of rectangles larger in size than the recording/reproducing apertures 7 and 8 for closing the apertures 7 and 8 and are of a predetermined thickness of an order of, for example, 0.3 mm. When seen in cross-section, the shutter member 10 is in the form of a letter U having the slide portion 13 as a web and the shutter portions 11 and 12 as both sides of the letter U, so that the shutter portions face each other with a gap in-between which corresponds to the thickness of the cartridge body 3.

The slide portion 13 is formed with a tongue 13a extending in one longitudinal direction. This tongue 13a is in the form of a flat rectangular plate portion of substantially the same width and thickness as the slide portion 13 interconnecting the shutter portions 11 and 12. The tongue 13a is extended in one longitudinal direction beyond the lateral side of the shutter portions 11 and 12.

Figure 3:
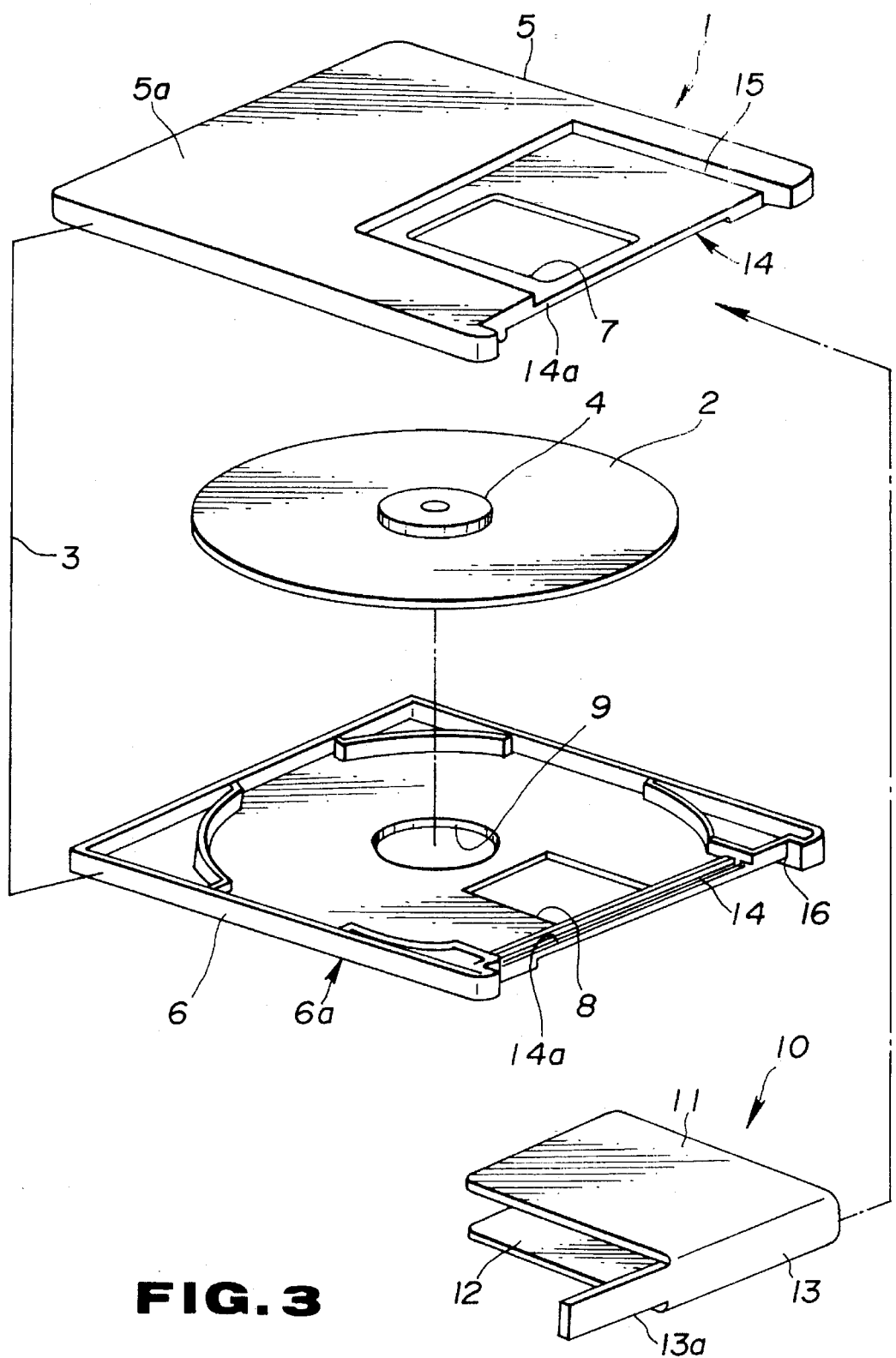
FIG. 3 is an exploded perspective view showing a disc cartridge provided with a shutter member according to a first embodiment of the present invention.
Figure 6:
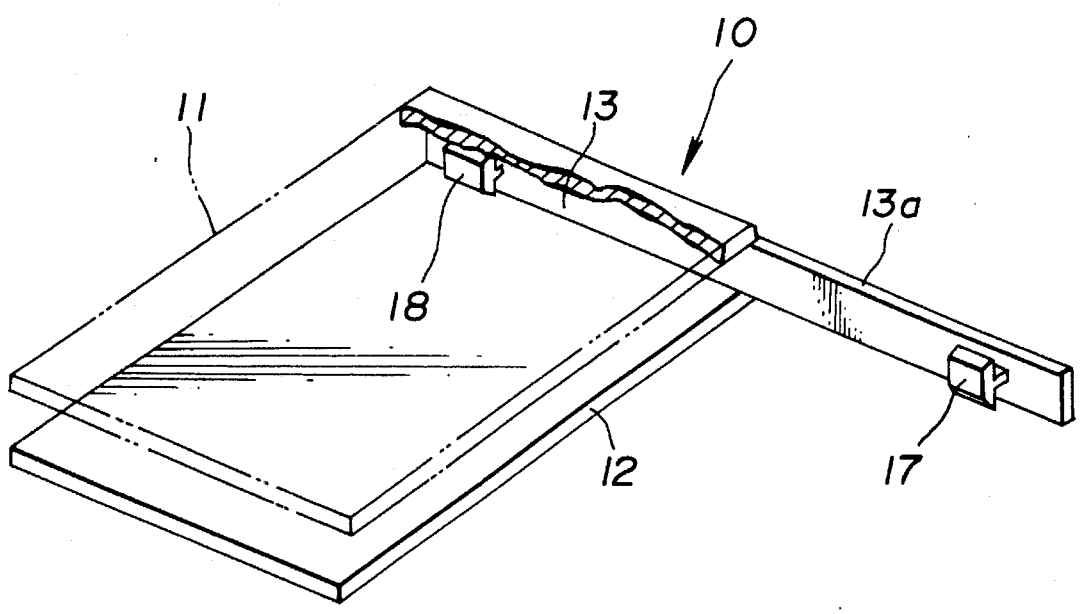
FIG. 6 is an enlarged perspective view showing a shutter member for a disc cartridge according to a first embodiment of the present invention, with a portion thereof being broken away.
Figure 7:
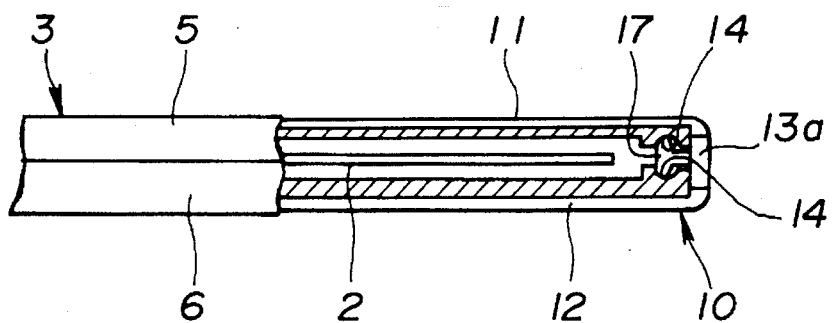
FIG. 7 is an enlarged side view showing a disc cartridge according to a second embodiment of the present invention, with a portion thereof being broken away.

Referring to FIGS. 3, 6 and 7, the inner surface of the slide portion 13, directed towards the distal ends or free ends of the shutter portions 11 and 12, is formed with first and second engaging pawls 17, 18 adapted to be engaged with supporting grooves 14, 14 formed in the vicinity of a lateral side of the cartridge body 3. These supporting grooves 14, 14 are defined between a pair of upright ribs extending parallel to each other and to the aforementioned lateral side of the upper and lower halves 5 and 6 of the cartridge body 3. A slit 14a is formed in the aforementioned lateral side for extending parallel to the supporting grooves 14, 14.

The engaging pawls 17, 18 are formed integral with the slide portion 13 and provided with enlarged ends. It is noted that the first engaging pawl 17 is provided at the foremost part of the tongue 13a while the second engaging pawl 18 is provided at the other end of the slide portion 13 opposite to the side thereof provided with the tongue 13a.

Figure 4:
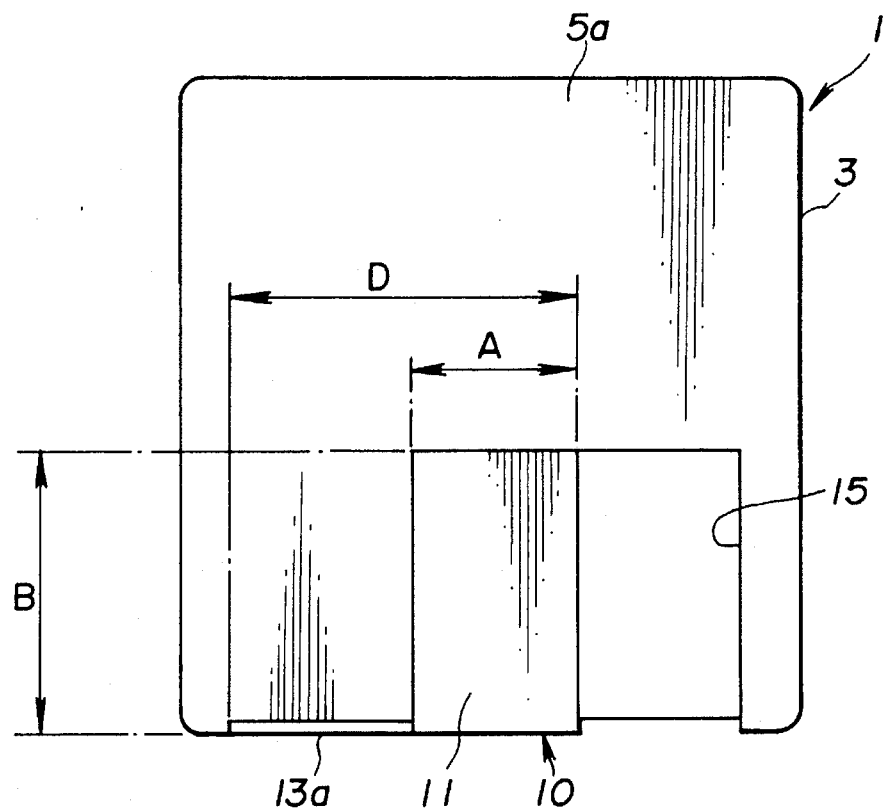
FIG. 4 is a plan view showing the disc cartridge shown FIG. 3, with the shutter portion of the shutter member in the first position.

Referring to FIGS. 4 and 5, the slide portion 13 is supported with its inner lateral side substantially in contact with the lateral side of the cartridge body 3 by introducing the engaging pawls 17 and 18 into the cartridge body 3 by means of the slit 14a and by engaging the enlarged ends of the engaging pawls 17, 18 in the supporting grooves 14, 14. Since the engaging pawls 17, 18 may be slid along the supporting grooves 14, 14, the slide portion 13 may be slid along the lateral side of the cartridge body 3.

By having its slide portion 13 supported by the lateral side of the cartridge body 3, the shutter member 10 is supported by the cartridge body 3, with the shutter portions 11 and 12 lying along the upper and lower major surfaces 5a and 6a, respectively. Also, by having its slide portion 13 slidable with respect to the cartridge body 3, the shutter member 10 may be slid with respect to the cartridge body 3, as shown in FIGS. 4 and 5, so that the shutter portions 11 and 12 are moved along the upper and lower major surfaces 5a and 6a, respectively.

By sliding the shutter member 10 with respect to the cartridge body 3, the upper shutter portion 11 is slid between the first position of closing the upper recording/reproducing aperture 7 as shown in FIG. 4 and the second position of opening the aperture 7 as shown in FIG. 5. Similarly to the upper shutter portion 11, the lower shutter portion 12 is slid, by sliding the shutter member 10 with respect to the cartridge body 3, between the first position of closing the lower recording/reproducing aperture 8 and the second position of opening the aperture 8. These first and second positions are so oriented relative to each other that, when the shutter portions 11, 12 are in the aforementioned second position, the first position is situated towards the side of the cartridge body corresponding to the direction of extension of the tongue 13a.

First and second shutter guide recesses 15 and 16 are formed in the portions of the major surfaces 5a and 6a of the cartridge body 3 corresponding to the travel passage of the shutter portions 11 and 12 of the shutter member 10. The first shutter guide recess 15, provided in the upper major surface 5a, is formed in an area to be traversed by the upper shutter portion 11 as it is moved from the first position to the second position, and is of a depth from the upper major surface 5a of the order of, for example, 0.3 mm, corresponding to the thickness of the upper shutter portion 11. In this manner, the upper surface of the upper shutter portion 11 is substantially flush with the upper surface section 5a throughout the stroke of movement of the shutter member 10 between the aforementioned first and second positions.

The second shutter guide recess 16 in the upper major surface 5a is formed in an area to be traversed by the lower shutter portion 12 as it is moved from the first position to the second position, and is of a depth from the lower major surface 6a of the order of, for example, 0.3 mm, corresponding to the thickness of the lower shutter portion 12. In this manner, the upper surface of the upper shutter portion 12 is substantially flush with the lower surface section 6a throughout the stroke of movement of the shutter member 10 between the aforementioned first and second positions.

With the above described disc cartridge 1 of the present invention, the shutter portions 11 and 12 of the shutter member 10 are in the aforementioned first position, during non-use time, for closing the recording/reproducing apertures 7 and 8 for preventing dust and dirt or the user's fingers from being intruded into the inside of the cartridge body 3 by means of the recording/reproducing apertures 7 and 8.

In use, the disc cartridge 1 is loaded on the disc recording/reproducing apparatus. At this time, the shutter member 10 is moved, by the opening means of the disc recording and/or reproducing apparatus, from the aforementioned first position to the second position of the shutter portions 11 and 12, as indicated by arrow c in FIG. 5. When in the second position, the shutter portions 11 and 12 open the recording/reproducing apertures 7 and 8 to permit information signals to be recorded or reproduced on or from the disc 2 by means of the recording/reproducing apertures 7 and 8.

With the above described shutter member 10 of the disc cartridge 1, since the slide portion 13 is formed with the tongue 13a, the sliding length of the slide portion 13 and the tongue 13a along the lateral side of the cartridge body 3, shown by a double-headed arrow D in FIG. 4, is longer than the sliding length of the shutter portions 11 and 12 along the aforementioned lateral side as indicated by a double-headed arrow A in FIG. 4. The result is that when the shutter member 10 is slid by the slide portion 13 being acted upon by the disc recording and/or reproducing apparatus, the shutter member 10 may be prevented from being tilted relative to the sliding direction due to friction between the shutter portions 11 and 12 and the cartridge body 3. Meanwhile, if the length of the slide portion 13 and the tongue 13a, as indicated by double-headed arrow D in FIG. 4, is selected to be longer than the length of the shutter portions 11 and 12 in the direction normal to the sliding direction, as indicated by a double-headed arrow B shown therein, the shutter member 10 may be protected more effectively from being tilted with respect to the sliding direction in the course of sliding of the shutter member 10.

Meanwhile, since the shutter member 10 is formed of a material exhibiting satisfactory temperature and humidity characteristics, such as polyacetal resin, it is unlikely to be deformed with changes in temperature or humidity. On the other hand, since the shutter member 10 is formed of a material exhibiting so-called self-wetting characteristics, such as the above mentioned polyactal resin, it is not subject to so-called powder debris, that is the phenomenon of fragments of material being rubbed off as powders due to friction between the shutter member and the cartridge body 3.

Figure 8:
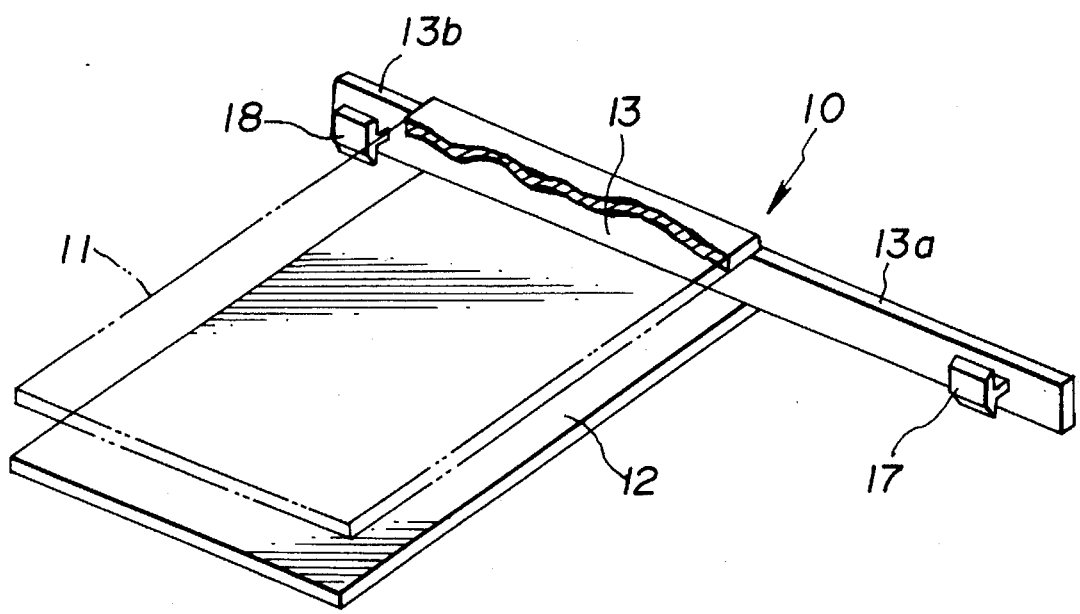
FIG. 8 is an enlarged perspective view showing a modified shutter member for a disc cartridge according to a second embodiment of the present invention, with a portion thereof being broken away.

The shutter member 10 for the disc cartridge of the present invention is not limited to the above described first embodiment in which the slide portion 13 of the shutter member 10 has a tongue extending only in one longitudinal direction. Referring to FIG. 8, the shutter member 10 for the disc cartridge according to a second embodiment of the present invention is provided not only with a tongue 13a extending in one longitudinal direction but a second tongue 13b extending in the opposite longitudinal direction. Similarly to the tongue 13a, the second tongue 13b is formed as a rectangular plate having a width and a thickness equal to those of the slide portion 13 interconnecting the shutter portions 11 and 12. The second tongue 13b is extended beyond the lateral side of the cartridge body 3.

When the first and second tongues 13a and 13b are formed in this manner with the slide portion 13 of the shutter member 10, the second engaging pawl 18 may be provided on the second tongue 13b. The shutter member 10 of the present embodiment may similarly be prevented from being tilted relative to its sliding direction due to the force of friction between the shutter portions 11, 12 and the cartridge body 3 even if the shutter member 13 is acted upon by the disc recording and/or reproducing apparatus as described above.

Figure 9:
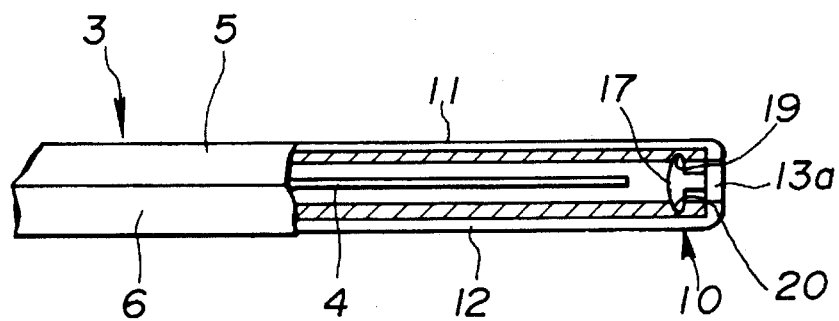
FIG. 9 is an enlarged side view similar to FIG. 7 showing a disc cartridge modified from that shown in FIG. 5, with a portion thereof being broken away.

With the above described disc cartridge 1, the supporting grooves 14, 14 are formed by gaps defined between the opposite parallel ribs. However, this is not limitative of the present invention. In an embodiment shown in FIG. 9, these supporting grooves 14, 14 are replaced by supporting slits 19, 20 formed on the inner surfaces of the upper and lower halves 5 and 6. The enlarged ends of the engaging pawls 17 and 18 are engaged in these supporting slits 19, 20, as in the supporting grooves 14, 14, for slidably supporting the slide portion 13 of the shutter member 10.

Meanwhile, with the shutter member 10 for the above described first and second embodiments of the present invention, the shutter portions 11 and 12 need be strong enough not to be deformed on repeated sliding movements of the shutter member 10 with respect to the cartridge body. That is, if strength of the shutter portions 11 and 12 falls short, the shutter portions 11 and 12 are deformed, so that not only the apertures 7 and 8 of the cartridge body 3 can not be opened or closed, but also the loading or unloading operation of the disc cartridge into or out of the disc recording and/or reproducing apparatus can not be performed. Above all, if the shutter member 10 is formed of synthetic resin, the shutter portions 11 and 12 tend to be deformed with changes in the operating environmental temperature. The above mentioned problem is felt most keenly when the shutter member 10 is reduced in thickness.

Referring to FIGS. 10 to 14, a shutter member for a disc cartridge according to a third embodiment of the present invention is explained.

In the following description, the parts or components which are the same as those shown in the preceding first and second embodiments are not explained for simplicity.

Figure 10:
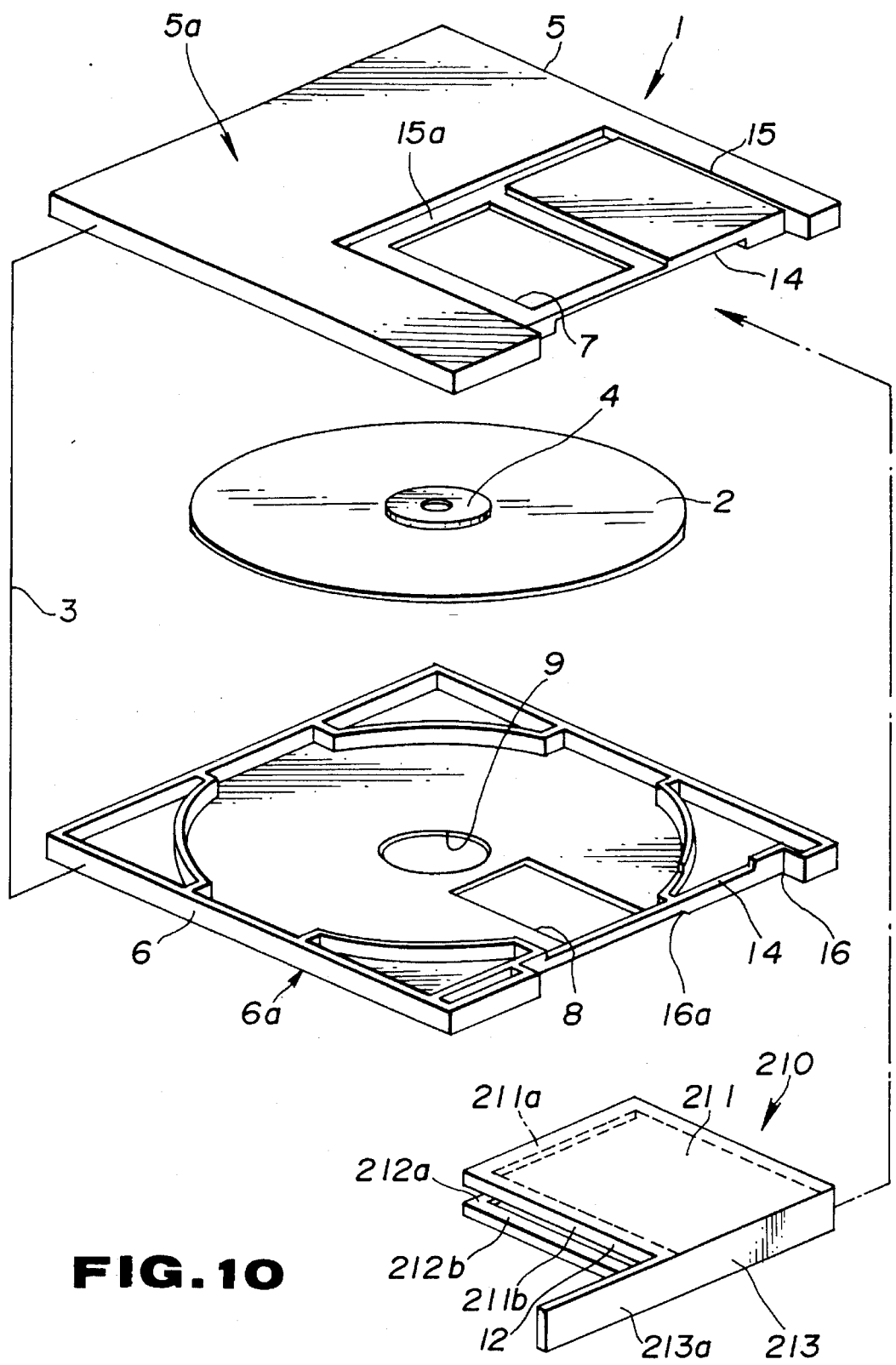
FIG. 10 is an exploded perspective view showing a disc cartridge provided with a shutter member according to a third embodiment of the present invention.
Figure 11:
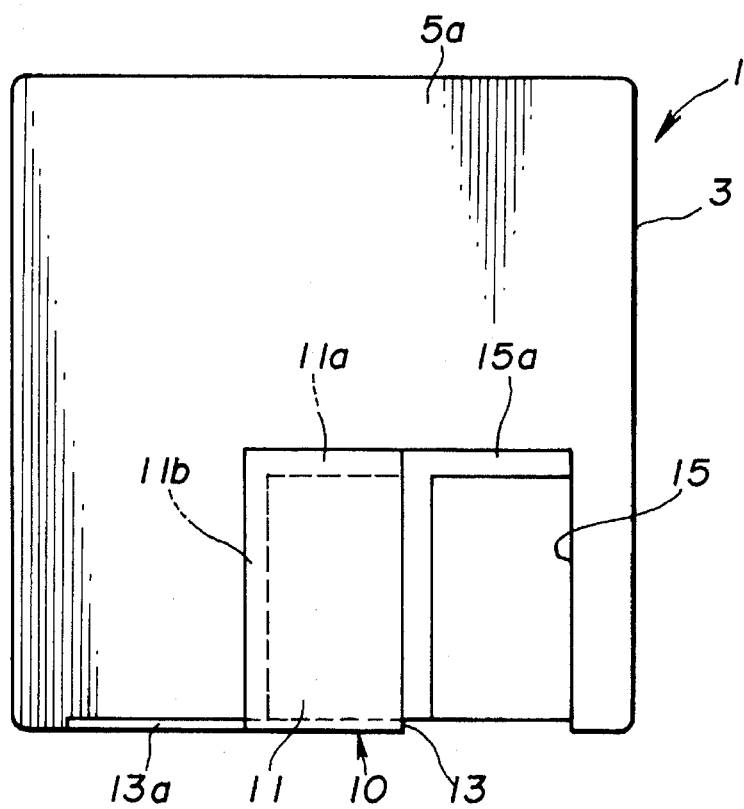
FIG. 11 is a plan view showing the disc cartridge shown in FIG. 10, with the shutter portion of the shutter member in the first position.

A shutter member 210 for the disc cartridge shown in FIG. 10 is used for opening or closing the recording/reproducing apertures 7 and 8. The shutter member 210, formed integrally of a synthetic resin, such as polyacetal resin, is comprised of upper and lower shutter portions 211 and 212, lying oppositely to each other, and a connecting portion 213 interconnecting these shutter portions 211 and 212. Each of the shutter portions 211 and 212 is in the form of a rectangle slightly larger in size than the apertures 7 and 8 for completely closing these apertures 7 and 8. When seen in cross-section, the shutter member 210 is in the form of a letter U with the connecting portion 213 forming the web substantially equal to the thickness of the cartridge body 3 and the shutter portions 211, 212 forming the sides of the letter U, respectively. The shutter portions 211, 212 are of a predetermined uniform thickness of the order of, for example, 0.3 mm.

Similarly to the preceding embodiments, the shutter member 210 for the present disc cartridge is formed integrally with a tongue 13a extending in the sliding direction for stabilizing the sliding movement of the shutter member 210 with respect to the cartridge body 3.

On a surface of the upper shutter portion 211 of the shutter member 210 facing the lower shutter portion 212, first and second ribs 211a and 211b are formed integrally. Similarly, on a surface of the lower shutter portion 212 of the shutter member 210, facing the upper shutter portion 211, first and second ribs 212a and 212b are formed integrally.

The first rib 211a of the upper shutter portion 211 is formed on the free end of the upper shutter portion 211 for extending along the free end from one to the other lateral sides of the upper shutter portion 211. Similarly to the first rib 211a of the upper shutter portion 211, the first rib 212a of the lower shutter portion 212 is formed on the free end of the lower shutter portion 212 for extending along the free end from one to the other lateral sides of the lower shutter portion 212. These first ribs 211a, 212a run parallel to and face each other and are projected a predetermined distance of, for example, 0.3 mm, from the shutter portions 211, 212, respectively.

The second rib 211b of the upper shutter portion 211 is provided on one lateral side of the upper shutter portion 211 for extending along this lateral side from the proximal end to the free end of the shutter portion 211. Thus the second rib 211b is contiguous to the first rib 211a at the free end of the upper shutter portion 211. Similarly to the second rib 211b of the upper shutter portion 211, the second rib 212b of the lower shutter portion 212 is provided on one lateral side of the lower shutter portion 212 for extending along this lateral side from the proximal end to the free end of the shutter portion 212. Thus the second rib 212b is contiguous to the first rib 212a at the free end of the lower shutter portion 212. These first ribs 211b, 212b run parallel to and face each other and are projected a predetermined distance of, for example, 0.3 mm, from the shutter portions 211, 212, respectively.

The inner surface of the connecting portion 213 towards the proximal end of the shutter portions 211, 212 is formed with an engaging pawl 217 adapted for being engaged with the supporting groove 14 formed on the lateral side of the cartridge body 3. The inner surface of the tongue 13a is also provided with an engaging pawl 218 adapted for being engaged with the supporting groove 14. The engaging groove 14 is provided on the lateral side of the cartridge body 3 mating with the sides of the major surfaces 5a, 6a in the vicinity of the recording/reproducing apertures 7 and 8.

The shutter member 210 is supported by the cartridge body 3 by having the engaging pawls 217, 218 of the connecting portion 213 engaged in the supporting groove 14 so that the upper shutter portion 211 is extended along the upper major surface 5a and the lower shutter portion 212 is extended along the lower major surface 6a, with the distal ends being the free ends. With the engaging pawls 217, 218 being supported for sliding along the supporting grooves 14, the shutter member 210 may be slid relative to the cartridge body 3, so that the upper shutter portion 211 is slid along the upper major surface 5a and the lower shutter portion 212 is slid along the lower major surface 6a.

Figure 12:
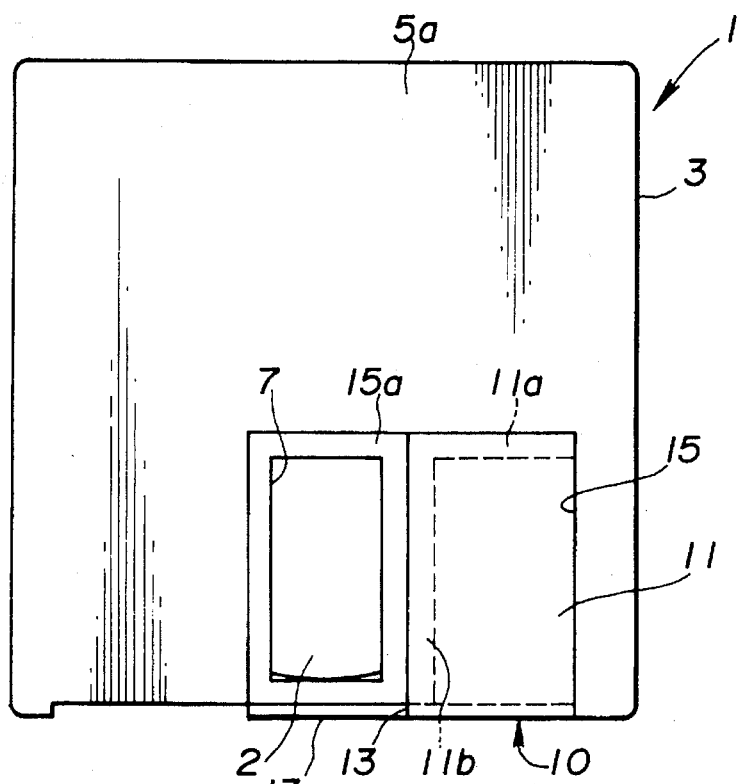
FIG. 12 is a plan view showing the disc cartridge shown in FIG. 10, with the shutter portion of the shutter member in the second position.
Figure 13:
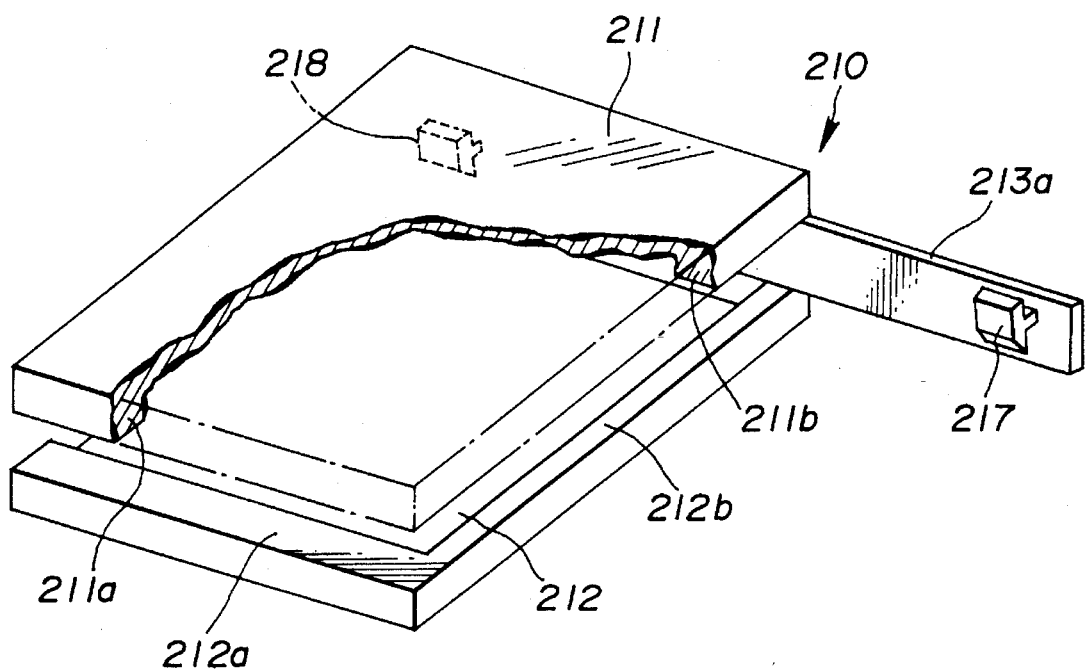
FIG. 13 is an enlarged perspective view showing a shutter member for a disc cartridge according to the third embodiment of the present invention, with a portion thereof being broken away.
Figure 14:
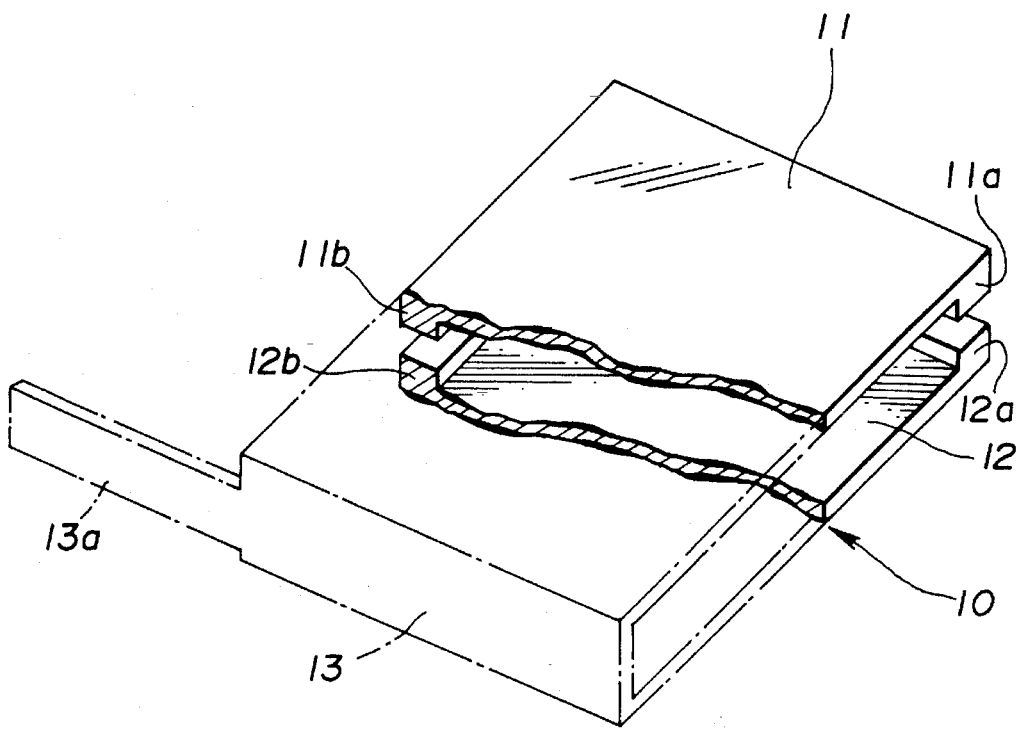
FIG. 14 is an enlarged perspective view showing the shutter member for a disc cartridge according to the third embodiment of the present invention, shown in a direction different from that of FIG. 13 and shown with a portion thereof being broken away.

By sliding the shutter member 210 relative to the cartridge body 3, the upper shutter portion 211 is slid between the first position of closing the upper recording/reproducing aperture 7 as shown in FIG. 12 and the second position of opening the aperture 7 as shown in FIG. 13. Similarly to the upper shutter portion 211, the lower shutter portion 212 is slid, by sliding the shutter member 210 with respect to the cartridge body 3, between the first position of closing the lower recording/reproducing aperture 8 and the second position of opening the aperture 8. These first and second positions are so oriented relative to each other that, when the shutter portions 211, 212 are in the aforementioned second position, the first position is situated towards the lateral side of the cartridge body associated with the second ribs 211b, 212b of the shutter portions 211, 212. With the present shutter member 210, the first ribs 211a, 212a are extended along the sliding direction of the shutter member 210 with respect to the shutter member 210, while the second ribs 211b, 212b are extended in a direction normal to the sliding direction of the shutter member 210 with respect to the cartridge body 3.

First and second shutter guide recesses 15 and 16 are formed in those portions of the major surfaces 4a and 5a of the cartridge body 3 through which the shutter member 210 is moved. The first shutter guide recess 15 in the upper major surface 5a is formed in an area to be traversed by the upper shutter portion 211 as it is moved from the first position to the second position, and is of a depth from the upper major surface 5a of the order of, for example, 0.3 mm, corresponding to the thickness of the upper shutter portion 211. Within an area of the first shutter member guide recess 15 to be traversed by the first and second ribs 211a, 211b of the shutter portion 211 in the course of movement of the shutter member 210 from the first position to the second position, there is formed a rib guide recess 15a which is of a predetermined depth from the upper major surface 5a of, for example, the order of 0.6 mm, corresponding to the thickness of the ribs 211a, 211b of the shutter portion 211. This rib guide recess 15a is provided in the vicinity of the upper recording/reproducing aperture 7 and of the periphery of the first shutter guide recess 15 corresponding to the mid region of the upper major surface 5a. In this manner, the upper surface of the upper shutter portion 211 is substantially flush with the upper surface section 5a throughout the stroke of movement of the shutter member 210 between the aforementioned first and second positions.

The second shutter guide recess 16 in the lower major surface 6a is formed in an area to be traversed by the lower shutter portion 212 as it is moved from the first position to the second position, and is of a depth from the upper major surface 6a of the order of, for example, 0.3 mm, corresponding to the thickness of the lower shutter portion 211. Within an area of the second shutter guide recess 16 to be traversed by the first and second ribs 212a, 212b of the lower shutter portion 212 in the course of movement of the shutter member 210 from the first position to the second position, there is formed a rib guide recess 16a which is of a predetermined depth from the lower major surface 6a of, for example, the order of 0.6 mm, corresponding to the thickness of the ribs 212a, 212b of the shutter portion 212. This rib guide recess 16a is provided within the second shutter guide recess 16 in the vicinity of the upper recording/reproducing aperture 7 and of the periphery of the second shutter guide recess 16 corresponding to the mid region of the lower major surface 6a. In this manner, the lower surface of the lower shutter portion 212 is substantially flush with the lower surface section 6a throughout the stroke of movement of the shutter member 210 between the aforementioned first and second positions.

With the above described disc cartridge 1 of the present invention, the shutter portions 211, 212 of the shutter member 210 are kept during non-use time in the aforementioned first position of closing the recording/reproducing apertures 7 and 8 for preventing dust and dirt or the user's fingers from being intruded into the inside of the cartridge body 3 by means of the recording/reproducing apertures 7 and 8. On the other hand, when the disc cartridge 1 is in use, the shutter portions 211, 212 of the shutter member 210 are brought to the aforementioned second position of opening the apertures 7 and 8 for permitting information signals to be written or read on or from the disc 2 by means of the recording/reproducing apertures 7 and 8.

With the shutter portions 211, 212 of the shutter portion 210, the in-plane curvature is reinforced by the first ribs 211a, 211b running at right angles to the second ribs 212a, 212b.

Meanwhile, since the shutter member 210 is formed of a material exhibiting satisfactory temperature and humidity characteristics, such as polyacetal resin, it is unlikely to be deformed with changes in temperature or humidity.

On the other hand, since the shutter member 210 is formed of a material exhibiting so-called self-wetting characteristics, such as the above mentioned polyactal resin, it is not subject to so-called powder debris, that is the phenomenon of fragments of material being rubbed off as powders due to friction between the shutter member and the cartridge body 3. By adjusting the protuberance of the first ribs 211a, 212a and the depth of the portions of the rib guide recesses 15a, 16a mating with these ribs, it becomes possible to prevent sliding contact between the surfaces of the shutter portions 211, 212 and the cartridge body 3 in the course of the sliding movement of the shutter member 20. In this manner, the aforementioned powder debris may be prevented more effectively.

It is noted that the present invention is not limited to a disc cartridge in which the recording/reproducing apertures are formed in both of its major surfaces, but may also be applied to a disc cartridge in which the recording/reproducing aperture is formed in one of its major surfaces. In this case, the shutter member is provided with a sole shutter portion in association with the sole recording/reproducing aperture.

It is also noted that the present invention is not limited to a disc cartridge adapted for accommodating an optical disc or a magneto-optical disc, but may also be applied to a disc cartridge adapted for accommodating a magnetic disc, such as a so-called floppy disc.

What is claimed is:

1. A disc cartridge comprising:

a cartridge body, formed with at least one aperture and a groove, for accommodating a disc in which a portion of the disc is exposed to an exterior environment by the aperture, the groove being formed on a lateral side of the cartridge body;

an integrally formed shutter portion movably mounted on the cartridge body between a first position of opening the aperture and a second position of closing the aperture, the shutter portion including a slide portion and at least one rectangularly shaped plate portion and a pair of projections, the slide portion being formed with a tongue extended along the lateral side of the cartridge body so that the length of the slide portion along a slide direction of the shutter portion is longer than the length of the shutter portion along the slide direction, the tongue being formed with one of the projections, the other of the projections being formed on another side of the slide portion and a corner of the plate portion, each of the projections being engaged with the groove, and with at least one rib being formed on an inside surface of the plate portion of the shutter portion and extended in a direction perpendicular to the slide direction of the shutter portion.

2. A disc cartridge according to claim 1, wherein said shutter portion extends perpendicularly to the lateral side of the cartridge body and wherein said shutter is provided with an engaging portion engaged with said groove.

3. A disc cartridge according to claim 1, wherein said shutter is provided with a second tongue along the lateral side of said cartridge body and wherein said second tongue is also provided with an engaging portion engaged with said groove.

4. A disc cartridge comprising; a cartridge body having an aperture therein for exposing a portion of a disc accommodated therein to an exterior environment, a shutter integrally formed of a slide portion slidably mounted on said cartridge body by being engaged with a groove formed in a lateral side of said cartridge body, and a shutter portion for opening or closing said aperture, from a synthetic material, said shutter portion being slid between a first position of closing said aperture by said shutter portion and a second position of opening said aperture, said slide portion being formed with a tongue extended along said lateral side of said cartridge body so that a length of said slide portion along a sliding direction of said shutter is longer than a length of said shutter portion along said sliding direction, said tongue being formed with an engaging portion engaged with said groove, wherein said shutter portion is provided on a surface facing said cartridge body with reinforcement means for reinforcing said shutter portion, the reinforcement means including a first rib provided for extending along the sliding direction of the shutter on a surface of said shutter portion facing said cartridge body and a second rib provided on a surface of said shutter portion facing said cartridge body for extending perpendicular to the sliding direction of the shutter.

5. A disc cartridge according to claim 4, wherein said shutter portion of said shutter extends perpendicularly to the lateral side of the cartridge body and wherein said shutter is provided with an engaging section engaged with said groove.

6. A disc cartridge according to claim 4, wherein said shutter is provided with a second tongue extended along the lateral side of said cartridge body and wherein said second tongue is also provided with an engaging section engaged with said groove.

* * * * *